United States Patent
Fukugawa et al.

(10) Patent No.: US 6,695,248 B2
(45) Date of Patent: Feb. 24, 2004

(54) PHOTOSENSITIVE MATERIAL ROLL

(75) Inventors: Masafumi Fukugawa, Kanagawa (JP); Nobuhiko Kashiwagi, Kanagawa (JP); Taisuke Nakanishi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/144,046

(22) Filed: May 14, 2002

(65) Prior Publication Data

US 2002/0171004 A1 Nov. 21, 2002

(30) Foreign Application Priority Data

May 15, 2001 (JP) ........................... 2001-145315

(51) Int. Cl.[7] .................. B65H 75/10; B65H 75/24; B65H 18/28; B65D 85/672
(52) U.S. Cl. ............... 242/609.4; 242/597.6; 242/611.2; 242/613.5; 242/160.4; 242/573.7; 206/410
(58) Field of Search .................. 242/609, 609.4, 242/611.1, 611.2, 613.5, 160.1, 160.4, 611, 608, 597.6, 573.7; 206/316.1, 400, 398, 401, 415, 416, 413, 410

(56) References Cited

U.S. PATENT DOCUMENTS

| | | | |
|---|---|---|---|
| 2,680,633 A | | 6/1954 | Brown |
| 3,368,767 A | * | 2/1968 | Schmidt ............ 242/611.2 |
| 3,432,112 A | | 3/1969 | Hardy |
| 3,878,997 A | * | 4/1975 | Adams et al. ............ 242/597.6 |
| 4,079,896 A | | 3/1978 | Plach |
| 4,733,777 A | | 3/1988 | Van Geyte et al. |
| 6,179,123 B1 | * | 1/2001 | Shigeta et al. ............ 206/413 |
| 6,481,904 B2 | * | 11/2002 | Fukugawa et al. ........... 206/413 |

FOREIGN PATENT DOCUMENTS

| | | |
|---|---|---|
| DE | 42 26 417 A1 | 2/1994 |
| EP | 1 011 021 A1 | 6/2000 |
| EP | 1 113 319 A1 | 7/2001 |
| JP | 2000-181018 | 6/2000 |
| WO | WO 95/00418 | 1/1995 |

OTHER PUBLICATIONS

USSN 09/745,868, Q62444, Filed Dec. 26, 2000.

* cited by examiner

Primary Examiner—John M. Jillions
(74) Attorney, Agent, or Firm—Sughrue Mion, PLLC

(57) ABSTRACT

A light-shielded photosensitive material roll is provided in which a length of a light-shielding flanged cylinder is a length of an extent which enables easy insertion, industrially, of the flanged cylinder into a winding core of the photosensitive material roll, and also, the photosensitive material roll can be stably supported at any of various types of driving shafts. In the light-shielded photosensitive material roll, a spacer sheet, which has substantially a same thickness as a thickness of the light-shielding flanged cylinder, is bonded and fixed to an inner side wall surface of the winding core corresponding to a position at which a distal end portion of a cylindrical portion of the flanged cylinder is extended.

16 Claims, 7 Drawing Sheets

PHOTOSENSITIVE MATERIAL ROLL

BACKGROUND OF THE INVENTION

1. Field of the Invention

The present invention relates to a light-shielded photosensitive material roll which, in a lighted room, is loaded into a plate making machine using a photosensitive material.

2. Description of the Related Art

An elongated photosensitive material sheet is, in a state of being wound-up in a roll form on a winding core, loaded into a plate making machine which uses a photosensitive material. Usually, the side surfaces of the photosensitive material roll are covered by ring-shaped light-shielding sheets and the periphery of the photosensitive material roll is covered by a light-shielding leader so that the photosensitive material roll can be loaded into the plate making machine in a lighted room. (Hereinafter, a photosensitive material roll which is covered by light-shielding members is called a light-shielded photosensitive material roll.)

At the light-shielded photosensitive material roll, generally, the ring-shaped light-shielding sheets are fixed to the side surfaces of the photosensitive material roll so as to be nipped by the end surfaces of the winding core and the flanges of light-shielding flanged cylinders which are inserted into the opening portions of the winding core (see Japanese Patent Application Laid-Open (JP-A) No. 2000-181018).

Various types of photosensitive material roll driving shafts of plate making machines have been developed and put into use. Representative examples thereof are a rod-shaped driving shaft having the same outer diameter as the inner diameter of the winding core, and an outer-diameter-movable-type driving shaft in which the outer diameter of the distal end portion of the driving shaft is enlarged so as to be made equal to the inner diameter of the winding core after the driving shaft has been inserted into the winding core.

In a light-shielded photosensitive material roll in which the ring-shaped light-shielding sheets are fixed by light-shielding flanged cylinders, the cylindrical portions of the light-shielding flanged cylinders which are inserted into the winding core contact the driving shaft. Accordingly, in a conventional light-shielding flanged cylinder, the length of the tube portion must be made to be a length which is from the opening portion of the winding core to the enlarged portion of the outer-diameter-movable-type driving shaft.

Generally, in a light-shielding flanged cylinder which is used in a light-shielded photosensitive material roll, the outer diameter of the cylinder is substantially the same as the inner diameter of the winding core so that the cylinder securely contacts the inner wall of the winding core. Accordingly, if the length of the tube portion of the light-shielding flanged cylinder is excessively long, it is difficult to insert the light-shielding flanged cylinder into the winding core of the photosensitive material roll.

SUMMARY OF THE INVENTION

An object of the present invention is to overcome the above-described problems.

In order to achieve this object, in accordance with an aspect of the present invention, there is provided a photosensitive material roll which can be mounted in a predetermined machine via an adapter, comprising: a hollow, cylindrical winding core; an elongated photosensitive material sheet wound-up on the winding core; an annular member installed in an opening of the winding core; and a spacer mounted to an inner peripheral wall of the opening of the winding core on an imaginary extension, along a direction of installing the annular member, of an installing side distal end portion of the annular member, so as to be positioned at a position which is separated by a predetermined distance from the distal end portion, wherein the annular portion and the spacer can respectively work to integrally connect the winding core and the adapter.

DESCRIPTION OF THE PREFERRED EMBODIMENTS

The structure of a light-shielded photosensitive material roll of the present invention and the main structural members thereof will be described with reference to the appended drawings.

Figure 1:
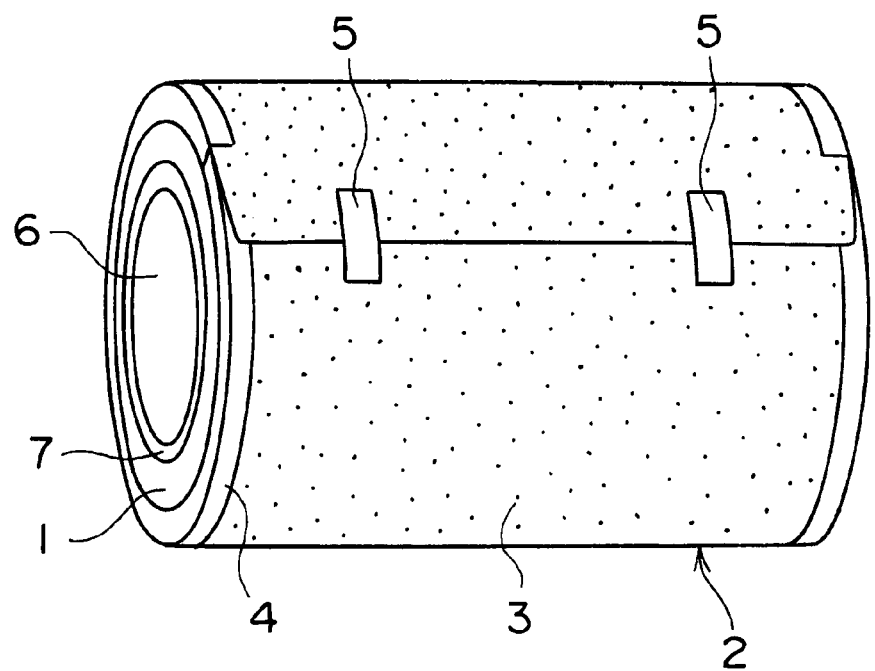
FIG. 1 is a perspective view showing an example of a light-shielded photosensitive material roll of the present invention.

FIG. 1 is a perspective view of an example of a light-shielded photosensitive material roll of the present invention. The photosensitive material roll is shielded from light by a pair of ring-shaped side surface light-shielding sheets 1 which are mounted to the winding core of the photosensitive material roll, and by a light-shielding leader 2 which is disposed such that the both side end portions thereof cover the entire outer peripheries of the ring-shaped side surface light-shielding sheets. The ring-shaped side surface light-shielding sheet 1 is fixed so as to be sandwiched between the end surface of a winding core and a flange portion 7 of a light-shielding flanged cylinder 6 which is inserted into an opening portion of the winding core of the photosensitive material roll. The final end of the light-shielding leader 2, which is wound on the periphery of the photosensitive material roll, is fastened by adhesive tapes 5.

Figure 2:
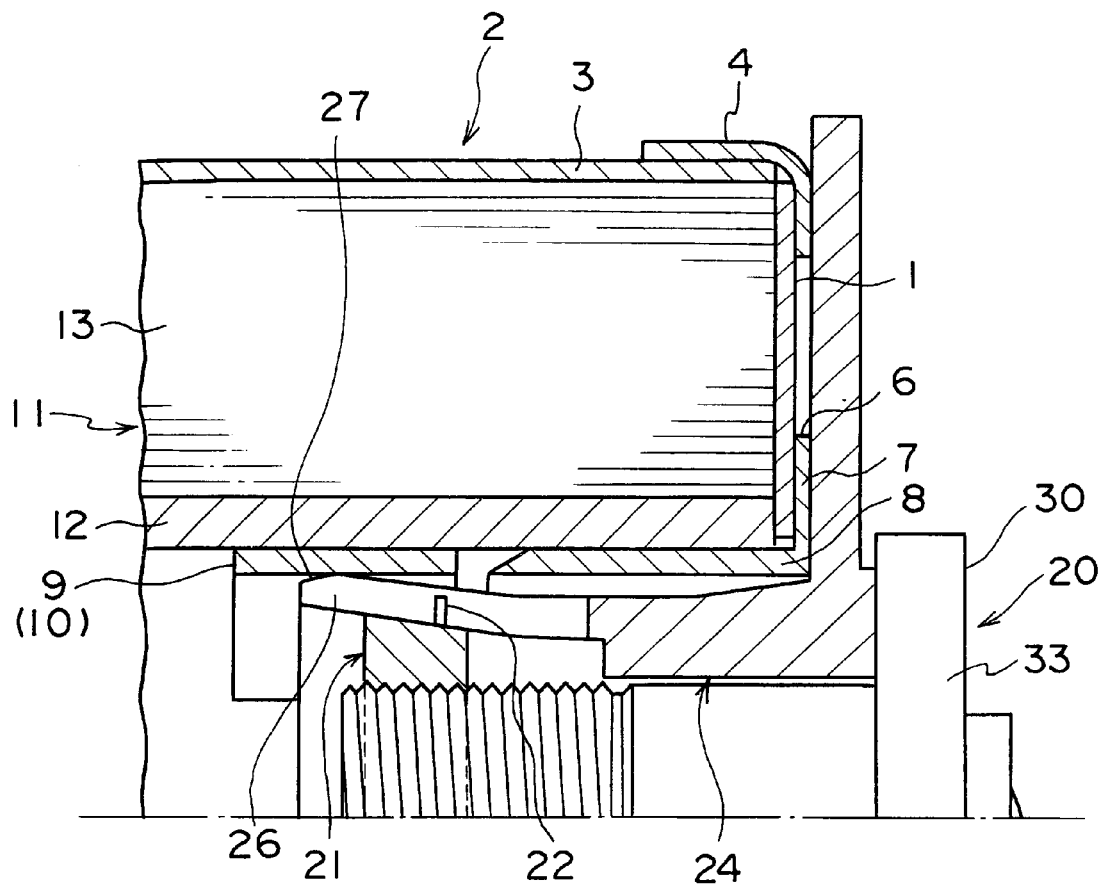
FIG. 2 is a partial cross-sectional view of the example of the light-shielded photosensitive material roll of the present invention.

FIG. 2 is a partial cross-sectional view of the example of the light-shielded photosensitive material roll of the present invention. In the light-shielded photosensitive material roll of the present invention, a spacer sheet 9, which has substantially the same thickness as that of a cylindrical portion 8 of the flanged cylinder 6, is bonded and fixed to the inner side wall surface of a winding core 12 of a photosensitive material roll 11 which corresponds to a position located on an imaginary extension of the distal end portion of the cylindrical portion 8 toward the interior of the winding core.

A driving shaft 20 is an outer-diameter-movable-type driving shaft. Expanding portions 27 of a chucking flange 24 contact the spacer sheet 9. The thickness of the spacer sheet 9 preferably falls within a range of −0.2 mm to +0.3 mm with respect to the thickness of the cylindrical portion 8 of the flanged cylinder 6. For example, if the thickness of the cylindrical portion 8 of the flanged cylinder 6 is 0.5 mm, the spacer sheet 9 preferably has a thickness of 0.3 to 0.8 mm.

The spacer sheet 9 may be formed from a single sheet whose width (length in the peripheral direction of the winding core) is ½ or more of the inner periphery of the winding core 12. However, in order to facilitate lamination to the winding core, the spacer sheet is preferably formed from two or more spacer sheet units.

Figure 3:
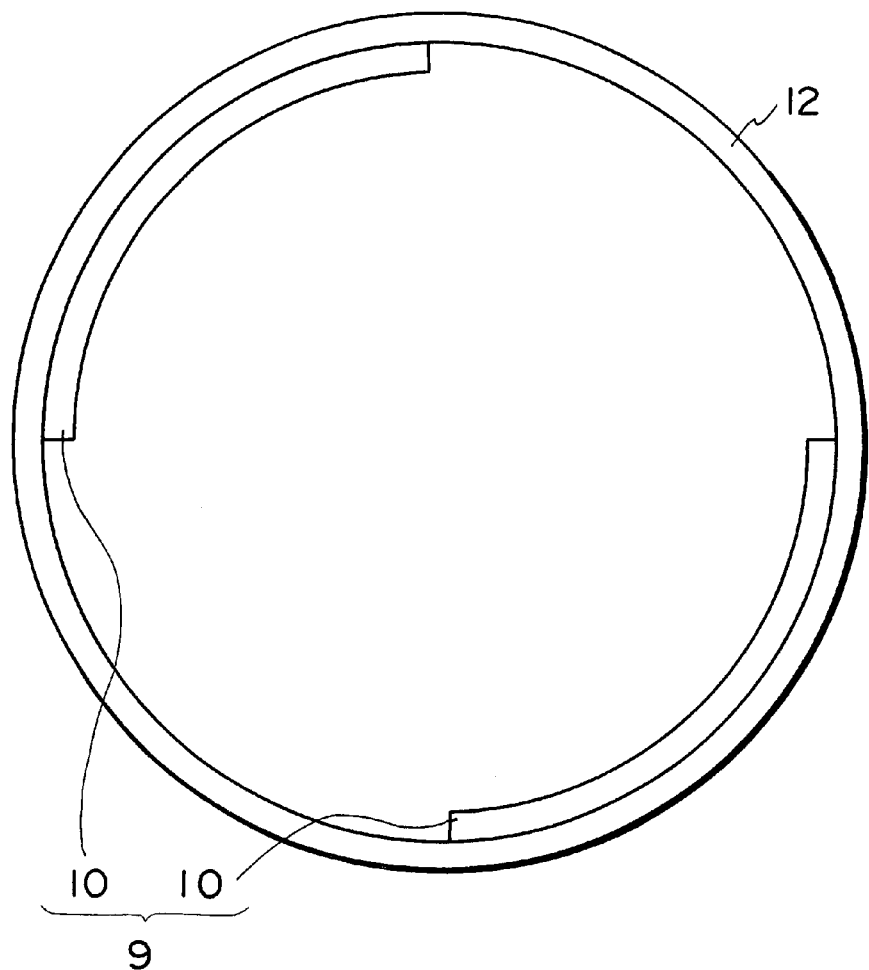
FIG. 3 is a cross-sectional view of an example of a winding core at which a spacer sheet is formed by two spacer sheet units.

FIG. 3 is a cross-sectional view of an example of a winding core at which the spacer sheet is formed from two spacer sheet units. The spacer sheet 9 is formed from two spacer sheet units 10 which have the same configuration. The spacer sheet units 10, which are bonded and fixed to the winding core 12, are bonded and fixed to the inner side wall surface of the winding core at positions which are symmetrical with respect to the central line of the winding core 12. The width (the length in the peripheral direction of the winding core) of the spacer sheet unit 10 is usually a length corresponding to a range of ¼ to ⅓ of the inner periphery of the winding core 12. The length of the spacer sheet unit 10 (the length in the lengthwise direction of the winding core) is not particularly limited, but usually is in the range of 5 to 15 cm.

Any of various types of plate-shaped members, such as a paper plate, a plastic plate formed from a resin such as polystyrene, a metal plate formed from a metal such as aluminum, or the like, can be used as the spacer sheet 9, provided that it can be bonded and fixed to the inner side wall surface of the winding core 12. It is preferable that the plate-shaped member used for the spacer sheet 9 either has a fold or half-cuts formed in the surface thereof which extend along the lengthwise direction so that the spacer sheet 9 can be bent easily along the inner periphery of the winding core, or that the spacer sheet 9 is bent by calendar processing.

Note that the spacer sheet is not limited to a plate-shaped member, and for example, a tube-shaped member such as a paper tube, a plastic tube, a metal tube, or the like may be used.

As the means for bonding and fixing the spacer sheet to the winding core, any means using any type of adhesive such as a pressure sensitive adhesive, adhesive tape, a hot melt adhesive, a water-soluble adhesive, or the like, may be used.

Figure 4:
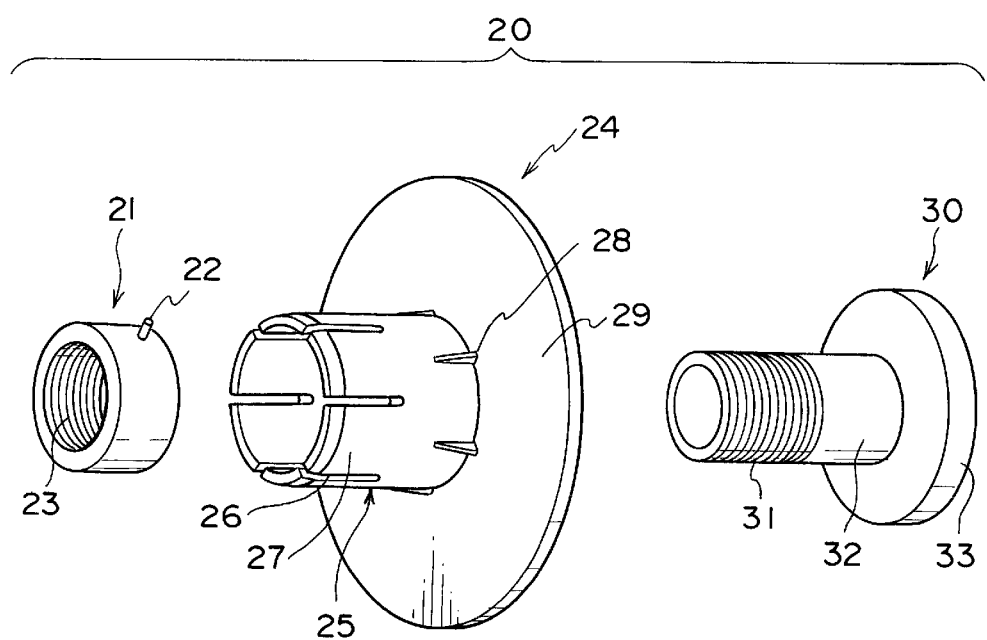
FIG. 4 is an exploded perspective view of an outer-diameter-movable-type driving shaft shown in FIG. 2.

FIG. 4 is an exploded perspective view of the outer-diameter-movable-type driving shaft of FIG. 2. The outer-diameter-movable-type driving shaft is formed from a tapered cone 21, the chucking flange 24, and a handle 30 for chucking. The tapered cone 21 is a tapered tube having a projection 22 on the outer side surface thereof, and a screw thread 23 in the inner side surface thereof, and whose outer diameter at one side is greater than the outer diameter at the other side. The chucking flange 24 is formed from a tubular boss portion 25 and a flange portion 29. The boss portion 25 has an inner diameter which is greater than the outer diameter of one opening portion of the tapered cone 21 and smaller than the outer diameter of the other opening portion of the tapered cone 21. Cut-outs 26, which extend in the lengthwise direction, are formed in the distal end of the boss portion 25. The expanding portions 27 are formed by the cut-outs 26. Six convex portions 28 are provided at equal intervals at the flange portion 29 side of the boss portion 25. The convex portions 28 function to fix the chucking flange 24 such that the chucking flange 24 does not run idly within the winding core of the photosensitive material roll. The handle 30 for chucking is formed from a cylindrical projection 32 and a disc-shaped handle portion 33. The cylindrical projection 32 has, at the distal end thereof, a screw portion 31 which screws together with the screw thread 23 of the tapered cone 21.

The projection 22 of the tapered cone 21 and one of the cut-outs 26 of the chucking flange 24 are engaged together, and the tapered cone 21 is inserted into the boss portion 25. When the screw thread 23 of the tapered cone 21 and the screw portion 31 of the handle 30 for chucking are fit together and the handle portion 31 is rotated, the tapered cone 21 and the handle 30 for chucking are fastened together. The tapered cone 21 enters into the interior of the boss portion 25 and, in doing so, spreads apart the expanding portions 27 of the boss portion 25. Such an outer-diameter-movable-type driving shaft is employed in, for example, a plate making machine (product name: SelectSet 7000, Avantra series) manufactured by Agfa-Gevaert Aktiengesellschaft.

Figure 5:
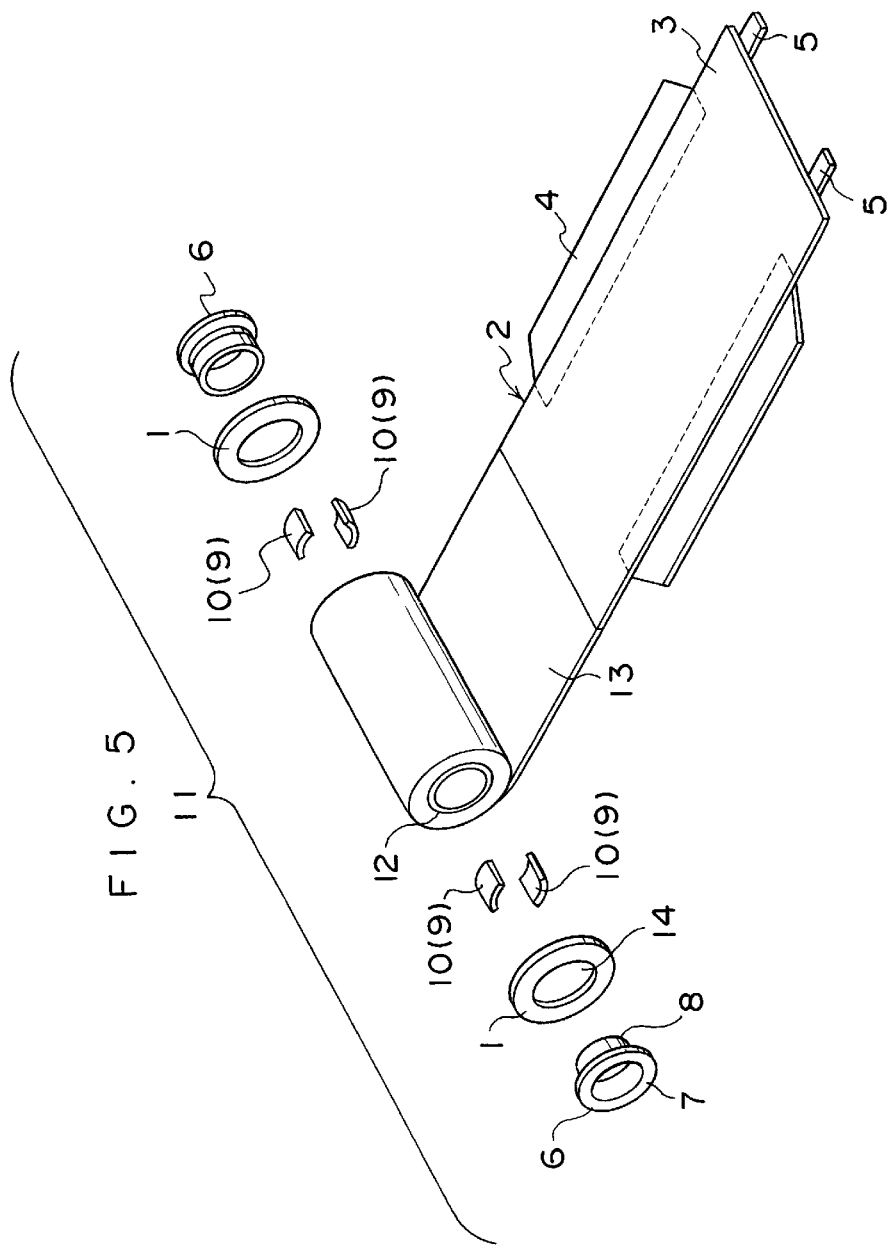
FIG. 5 is an exploded perspective view of the example of the light-shielded photosensitive material roll of the present invention.

FIG. 5 is an exploded perspective view of the example of the light-shielded photosensitive material roll of the present invention. An elongated photosensitive material sheet 13 is wound-up on the periphery of the winding core 12 of the photosensitive material roll 11.

Examples of the photosensitive material sheet 13 are photosensitive materials for printing (photosensitive material films or paper for photographic plate making or photocomposition) and photosensitive materials for photographic printing paper (color paper or black-and-white photographic printing paper). Specific examples of photosensitive materials for printing are camera film, contact film, stripping film, duplicating film, laser film, camera paper, contact paper, stripping paper, duplicating paper, laser paper, dry facsimile film, lith film, and gravure film. Specific examples of photosensitive materials for photographic printing paper are color paper, color laser paper, reversal color paper, chrome paper, photographic printing paper for close contact, photographic printing paper for enlargement, multi-gradation photographic printing paper for enlargement, and photographic printing paper for special purposes.

The thickness of the winding core 12 is usually in the range of 1 to 5 mm. Usually, a paper tube is used for winding core 12. However, a plastic tube formed from a resin such as polystyrene or the like, or a metal tube formed from a metal such as aluminum or the like, may be used for the winding core 12. A buffer sheet (cushion sheet), which is a polyethylene-laminated paper or a foamed urethane sheet or the like, may be wound around the outer side surface of the winding core 12 such that traces of the pushing by the winding core are not pressed into the photosensitive material sheet which contacts the winding core.

The outer diameter of the ring-shaped side surface light-shielding sheet 1 is substantially equal to the outer diameter of the photosensitive material roll 11. Usually, the outer diameter of the ring-shaped side surface light-shielding sheet 1 is the same as the outer diameter of the photosensitive material roll or is slightly smaller than the outer diameter of the photosensitive material roll. The diameter of a circular hole 14, which is provided in the center of the ring-shaped side surface light-shielding sheet 1, is larger than the inner diameter of the winding core 12 and smaller than the outer diameter of the winding core 12. The thickness of the ring-shaped side surface light-shielding sheet 1 is usually in a range of 0.1 to 0.5 mm. The rigidity of the ring-shaped side surface light-shielding sheet 1 is preferably within a range of 30 to 150 [(cm)$^3$], as a value measured in accordance with the Clark method stipulated in JIS-P-8143 (Method of Testing Stiffness of Paper by Deadweight Bending Method).

A resin such as polyethylene, polyethylene terephthalate, polycarbonate, polystyrene (in particular, shock-resistant polystyrene), polyester, polypropylene or the like in which a light-shielding powder such as carbon black or the like is dispersed within a range of 1 to 10% by weight, can be used as the material of the ring-shaped side surface light-shielding sheet 1.

The ring-shaped side surface light-shielding sheet 1 may be a single-layer sheet formed from the aforementioned resin materials, but is preferably a layered sheet in which two or more films formed from the aforementioned resin materials are layered. An example of a layered sheet for the ring-shaped side surface light-shielding sheet is a layered sheet having a three-layer structure of polyethylene film (thickness: 20 to 40 μm)/polyethylene terephthalate film (thickness: 25 to 100 μm)/polyethylene film (thickness: 20 to 40 μm). Further, when the ring-shaped side surface light-shielding sheet and the flange of the flanged cylinder are heat-fused, a layered sheet, which has on one surface thereof a low-temperature heat sealable film (e.g., an ethylene-vinyl acetate copolymer film) can also be used. Specific examples of layered sheets having a low-temperature heat sealable film are a layered sheet having a four-layer structure in which an ethylene-vinyl acetate copolymer film is adhered onto one surface of the above-described layered sheet having a three-layer structure, and a layered sheet having a three-layer structure in which one of the polyethylene films of the above-described layered sheet having a three-layer structure is replaced with an ethylene-vinyl acetate copolymer film. In a ring-shaped side surface light-shielding sheet having a low-temperature heat sealable film on one surface thereof, it is preferable to color code the low temperature heat sealable film surface and the other surface such that they can be visually distinguished from one another. For example, the low temperature heat sealable film surface may be made to be black, and the other surface may be made to be gray, or the like.

Any of various types of laminating methods (e.g., a dry laminating method) may be used to laminate the films.

The flanged cylinder 6 is formed from the flange portion 7 and the cylindrical portion 8. The cylindrical portion 8 is inserted into the winding core 12 such that the ring-shaped side surface light-shielding sheet 1 is fixed by the flange portion 7 and the end surface of the winding core 12. In order to be able to strongly secure the cylindrical portion 8 inside the winding core 12, the outer diameter of the cylindrical portion 8 is substantially the same as the inner diameter of the winding core 12, and in particular, is preferably slightly larger than the inner diameter of the winding core 12.

Further, generally, the convex portions 28 are provided on the outer side surface of the driving shaft of the plate making machine. By making the convex portions 28 and the inner wall of the winding core contact one another, the driving shaft is fixed so as to not run idly within the winding core of the photosensitive material roll (see FIG. 4). In the present embodiment, the convex portions 28, which are provided at the driving shaft, contact the inner wall of the cylindrical portion 8 of the flanged cylinder 6. Thus, it is preferable to form projections or grooves at positions of the inner wall of the cylindrical portion 8, which positions correspond to the convex portions of the driving shaft.

Figure 6:
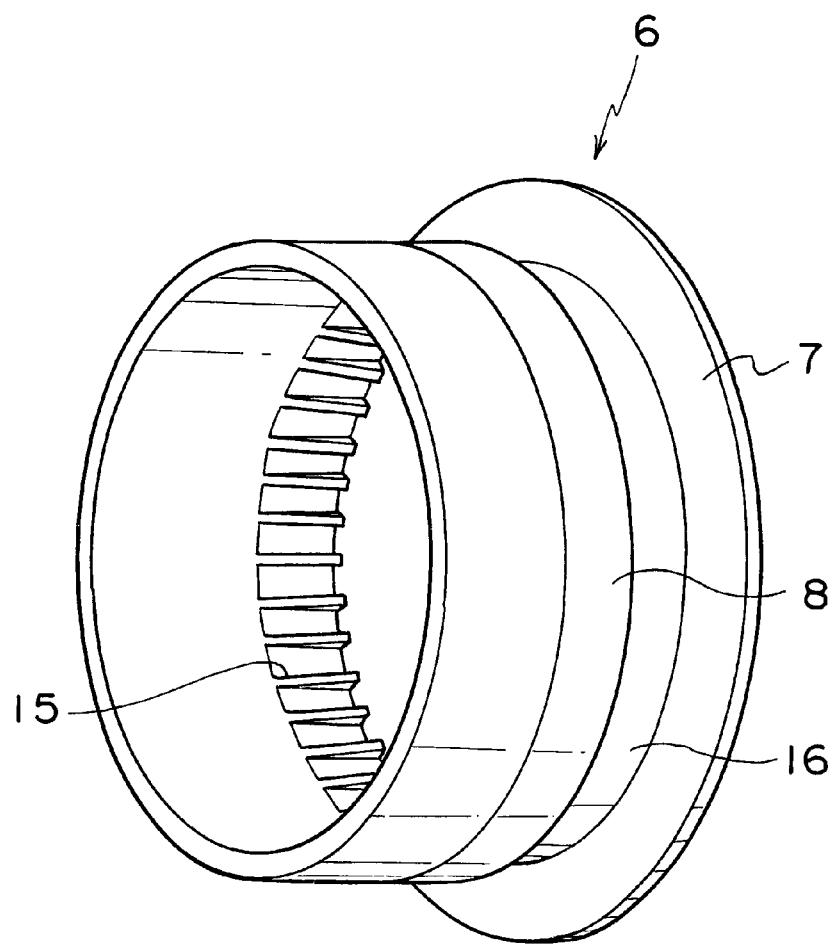
FIG. 6 is a perspective view showing an example of flanged cylinder which can be suitably used in the light-shielded photosensitive material roll of the present invention.
Figure 7:
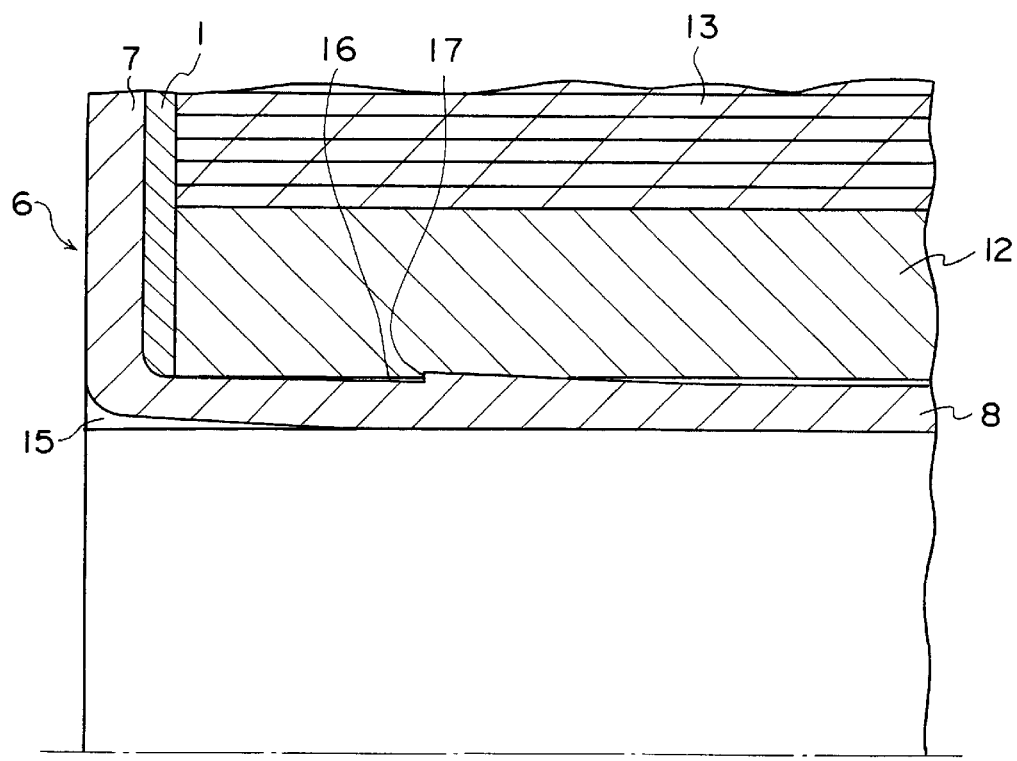
FIG. 7 is a partial cross-sectional view of a light-shielded photosensitive material roll using the flanged cylinder of FIG. 6.

FIG. 6 is a perspective view showing an example of a flanged cylinder which can be suitably used in the light-shielded photosensitive material roll of the present invention. FIG. 7 is a partial cross-sectional view of the light-shielded photosensitive material roll using the flanged cylinder of FIG. 6. A plurality of projections 15 for fixing the driving shaft, which contact the convex portions provided at the driving shaft such that the driving shaft does not run idly, are provided at the inner wall of the cylindrical portion 8 of the flanged cylinder 6. In FIGS. 6 and 7, the projections 15 for fixing the driving shaft are inclined such that the heights thereof increase toward the flange portion 7 side. The size of the projections 15 for fixing the driving shaft is set appropriately in accordance with the size of the convex portions 28 provided at the driving shaft. Usually, the tallest portion of the projection 15 for fixing the driving shaft is in a range of 0.1 to 0.3 mm, and the width thereof is in a range of 0.5 to 2.0 mm.

The projections 15 for fixing the driving shaft may be provided so as to simultaneously contact all of the convex portions of the driving shaft. For example, at the flange 24 for chucking of the driving shaft shown in FIG. 4, six convex portions are formed at the boss portion 25. In the case of this driving shaft, idle running of the driving shaft can be effectively prevented by providing the projections 15 for fixing the driving shaft at uniform intervals so as to simultaneously contact three of the convex portions. The number of projections 15 for fixing the driving shaft is not particularly limited. However, there are preferably 1 to 20 sets, with one set being three to six projections for fixing the driving shaft which are provided so as to simultaneously contact the convex portions of the driving shaft.

The outer diameter of the cylindrical portion 8 of the flanged cylinder 6 is preferably 100.1 to 103% of the inner diameter of the winding core. Further, it is preferable to provide a cylindrical portion recess portion 16 at the flange portion 7 side of the outer side surface of the cylindrical portion 8. By making the outer diameter of the cylindrical portion 8 of the flanged cylinder 6 to be greater than the inner diameter of the winding core, and by providing the cylindrical portion recess portion 16, as shown in FIG. 7, the cylindrical portion 8 inserted in the winding core 12 bends inwardly at the cylindrical portion recess portion 16. A projection 17 of the cylindrical portion recess portion 16 strongly contacts the inner wall of the winding core 12, such that the integration of the flanged cylinder 6 and the winding core 12 is strengthened. The length of the cylindrical portion 8 is usually in the range of 2 to 5 cm.

A resin such as polycarbonate, polystyrene (in particular, shock-resistant polystyrene), polyester, polypropylene or the like in which a light-shielding powder such as carbon black or the like is dispersed within a range of 1 to 10% by weight, can be used as the material of the flanged cylinder 6.

The light-shielding leader 2 is usually wound onto the periphery of the photosensitive material roll after the ring-shaped side surface light-shielding sheets 1 have been attached to the winding core 12. The length of the light-shielding leader 2 is greater than or equal to the outer circumference of the ring-shaped side surface light-shielding sheet, and is usually two to three times the outer circumference of the ring-shaped side surface light-shielding sheet. The width of the light-shielding leader 2 is wider than the width of the photosensitive material roll, to the extent that both end portions of the light-shielding leader 2 contact the outer side surfaces of the ring-shaped side surface light-shielding sheets.

In the method of making the both end portions of the light-shielding leader 2 contact the outer side surfaces of the ring-shaped side surface light-shielding sheets 1 it is preferable to use a method in which a heat shrinkable light-shielding sheet is used as the light-shielding leader, and the heat shrinkable light-shielding sheet is heat shrunk. When a heat shrinkable light-shielding sheet is used as the light-shielding leader, the entire light-shielding leader may be a heat shrinkable light-shielding sheet. However, using heat shrinkable light-shielding sheets only at the portions which contact the outer side surfaces of the ring-shaped side surface light-shielding sheets is preferable from the standpoint of costs for materials.

The light-shielding leader 2 shown in FIG. 5 is a structure in which heat shrinkable light-shielding sheets 4 are attached to both side end portions of a light-shielding sheet 3 which has the same width as the photosensitive material sheet and which hardly heat shrinks or does not heat shrink at all.

A resin such as low-density polyethylene, polyethylene terephthalate or the like, in which a light-shielding pigment such as carbon black or the like has been mixed in, can be used as the material of the light-shielding sheet 3. The light-shielding sheet may be a single layer sheet formed from the aforementioned resin materials. However, the light-shielding sheet is preferably a layered sheet in which two or more films formed from the aforementioned resin materials are layered. An example of a layered sheet for the light-shielding sheet is a layered sheet having a three-layer structure of polyethylene film/polyethylene terephthalate film/polyethylene film. It is preferable that the thickness of the polyethylene film is within the range of 20 to 100 $\mu$m, and that the thickness of the polyethylene terephthalate film is within the range of 25 to 175 $\mu$m. Any of various types of laminating methods (e.g., a dry laminating method) may be used to laminate the films.

It is preferable that the heat shrinkage rate in the lengthwise direction of the heat shrinkable light-shielding sheet 4 is relatively larger than the heat shrinkage rate in the widthwise direction. For example, the heat shrinkage rate in the lengthwise direction of the heat shrinkable light-shielding film at 100° C. is 5% or more, and preferably 15% or more, and, as an absolute difference, is 1% or more greater, and preferably 3% or more greater, and more preferably 5% or more greater than the heat shrinkage rate in the widthwise direction. Note that the heat shrinkage rate of the heat shrinkable light-shielding film is a value measured in accordance with the method stipulated in JIS-Z-1709-1976 (Film for Shrink Packaging).

The heat shrinkable light-shielding sheet 4 is preferably tearable in the lengthwise direction. More preferably, the Elmendorf tearing load in the lengthwise direction is within the range of 0.1 to 0.5 N. If the Elmendorf tearing load in the lengthwise direction is greater than 0.5 N, the heat shrinkable light-shielding sheet tends to become difficult to tear. Further, if the Elmendorf tearing load is less than 0.1 N, the heat shrinkable light-shielding film tends to become easy to tear during transport of the light-shielded photosensitive material roll. Note that the Elmendorf tearing load of the heat shrinkable light-shielding film is a value measured in accordance with the method stipulated in JIS-K-7128-2:1998 (Method of Testing Tear Strength of Plastic Film and Sheet: Part 2).

A layered sheet, in which a transparent or semi-transparent shrink film which has high heat shrinkability in the lengthwise direction and which is tearable in the lengthwise direction, and a light-shielding film which barely exhibits heat shrinkability or does not exhibit any heat shrinkability at all, are laminated, may be used as the heat shrinkable light-shielding sheet 4. In particular, a layered sheet having a three-layer structure of the light-shielding film/shrink film/light-shielding film is preferable. The thickness of each of the light-shielding films and shrink film is preferably in a range of 10 to 30 $\mu$m. For example, Fancy Wrap (trade name, manufactured by Gunze Ltd.) having a grade of THS, TNS, TAS, TBS, or TRS can be used as the shrink film. A film, such as, for example, a low-density polyethylene film or the like into which a pigment such as carbon black or the like has been mixed in, can be used as the light-shielding film.

In the light-shielded photosensitive material roll of the present invention, the length of a cylindrical portion of a light-shielding flanged cylinder is shorter than that of a conventional structure. Thus, the light-shielding flanged cylinder can relatively easily be inserted into the winding core of the photosensitive material roll.

What is claimed is:

1. A photosensitive material roll which can be mounted in a predetermined machine via an adapter, comprising:

a hollow, cylindrical winding core;

an elongated photosensitive material sheet wound-up on the winding core;

an annular member installed in an opening of the winding core; and a spacer mounted to an inner peripheral wall of the opening of the winding core on an imaginary extension, along a direction of installing the annular member, of an installing side distal end portion of the annular member, so as to be positioned at a position which is separated by a predetermined distance from the distal end portion, the spacer comprising a plurality of spacer elements, said spacer elements being disposed at the inner peripheral wall of the winding core, symmetrically with respect to a central axis of the winding core, wherein the annular portion and the spacer can respectively work to integrally connect the winding core and the adapter.

2. The photosensitive material roll of claim 1, wherein the spacer elements have substantially the same configuration.

3. The photosensitive material roll of claim 1, wherein a thickness of the spacer, in a direction of thickness of the winding core, and a thickness of the annular member, in the direction of thickness of the winding core, are substantially equal.

4. The photosensitive material roll of claim 1, wherein the annular member includes a cylindrical portion, and a flange portion extending in a radial direction from one end of the cylindrical portion.

5. The photosensitive material roll of claim 4, further comprising a donut-shaped light-shielding sheet nipped between the winding core and the flange portion of the annular member.

6. The photosensitive material roll of claim 5, wherein the donut-shaped light-shielding sheet has an outer diameter dimension which is substantially equal to an outer diameter dimension of a roll of the photosensitive material sheet wound around the winding core.

7. The photosensitive material roll of claim 1, further comprising a light-shielding leader connected to a final end portion of the photosensitive material sheet wound around the winding core.

8. The photosensitive material roll of claim 7, wherein the light-shielding leader has a light-shielding sheet, whose width is substantially equal to a width of the photosensitive material sheet and whose length is greater than or equal to a roll of the photosensitive material sheet, and heat shrinkable light-shielding sheets at both sides of the light-shielding sheet.

9. A photosensitive material roll which can be mounted in a predetermined machine via an adapter, wherein the adapter is located in the machine, comprising:

a hollow, cylindrical winding core;

an elongated photosensitive material sheet wound-up on the winding core;

an annular member installed in an opening of the winding core;

a spacer mounted to an inner peripheral wall of the opening of the winding core on an imaginary extension, along a direction of installing the annular member, of an installing side distal end portion of the annular member, so as to be positioned at a position which is separated by a predetermined distance from the distal end portion, the spacer comprising a plurality of spacer elements, said spacer elements being disposed at the inner peripheral wall of the winding core, symmetrically with respect to a central axis of the winding core; wherein the annular portion and the spacer operate as integral connection means for connecting the winding core and the adapter.

10. The photosensitive material roll of claim 9, wherein the spacer elements have substantially the same configuration.

11. The photosensitive material roll of claim 9, wherein a thickness of the spacer, in a direction of thickness of the winding core, and a thickness of the annular member, in the direction of thickness of the winding core, are substantially equal.

12. The photosensitive material roll of claim 9, wherein the annular member includes a cylindrical portion, and a flange portion extending in a radial direction from one end of the cylindrical portion.

13. The photosensitive material roll of claim 12, further comprising a donut-shaped light-shielding sheet nipped between the winding core and the flange portion of the annular member.

14. The photosensitive material roll of claim 13, wherein the donut-shaped light-shielding sheet has an outer diameter dimension which is substantially equal to an outer diameter dimension of a roll of the photosensitive material sheet wound around the winding core.

15. The photosensitive material roll of claim 9, further comprising a light-shielding leader connected to a final end portion of the photosensitive material sheet wound around the winding core.

16. The photosensitive material roll of claim 15, wherein the light-shielding leader has a light-shielding sheet, whose width is substantially equal to a width of the photosensitive material sheet and whose length is greater than or equal to a roll of the photosensitive material sheet, and heat shrinkable light-shielding sheets at both sides of the light-shielding sheet.

* * * * *